Oct. 15, 1968 — E. M. MOFFATT — 3,405,559

PRESSURE TRANSDUCER

Filed Nov. 7, 1966

INVENTOR
E. MARSTON MOFFATT
BY Louis H. Reens
ATTORNEY

# 3,405,559
PRESSURE TRANSDUCER
Elbert Marston Moffatt, Glastonbury, Conn., assignor to United Aircraft Corporation, East Hartford, Conn., a corporation of Delaware
Filed Nov. 7, 1966, Ser. No. 592,455
6 Claims. (Cl. 73—398)

ABSTRACT OF THE DISCLOSURE

This invention relates to a capacitive pressure transducer in which the measuring components, particularly a pressure-deformable diaphragm, are constructed from a brittle material to take advantage of low hysteresis and creep factors and a low thermal coefficient of expansion. In order to overcome the undesirably low tensile strength of the brittle material, the diaphragm is specially shaped and positioned within the transducer so that it will experience primarily uniform compressive stress which the material can more easily sustain.

---

This invention relates to an accurate capacitive pressure transducer which is relatively unaffected by external factors such as temperature and vibrations.

In the capacitive transducer pressure is generally applied to a diaphragm which carries one plate of a capacitor and the diaphragm deflects away from or toward a second plate which may be deflectable or stationary. The deflection of one plate of a capacitor with respect to the other causes a change in the capacitance. The capacitor is coupled into a detection network such as a frequency sensitive circuit and change in capacitance arising from the deflection of the diaphragm is transformed into an electrical signal directly related to the pressure being measured. In such transducers, the diaphragm opposes the applied pressure through its own strength. The mechanical properties of the diaphragm, therefore, play a dominant role in the output of the instrument. For an accurate instrument, it is essential that temperature coefficients, hysteresis, and creep deformation be minimized to maintain a high instrument repeatability.

One of the objects of this invention, therefore, is to teach a pressure transducer which is an order of magnitude more accurate than currently known transducers.

It is a further object of this invention to teach a pressure transducer in which thermal effects are minimized by using a material with a low coefficient of thermal expansion and by eliminating dissimilar materials from sensing elements of the transducer.

It is another object of this invention to each the use of a brittle material such as fused quartz in a pressure transducer sensing capsule.

It is another object of this inevntion to teach a pressure transducer in which the diaphragm has a very small mechanical hysteresis factor and a low amount of creep deformation to obtain a high degree of instrument repeatability.

It is still a further object of this invention to teach a pressure transducer in which the diaphragm compensates for first order vibration and acceleration errors.

Other objects and advantages will be apparent from the specification and from the accompanying drawings which illustrate an embodiment of the invention.

Figure 1:
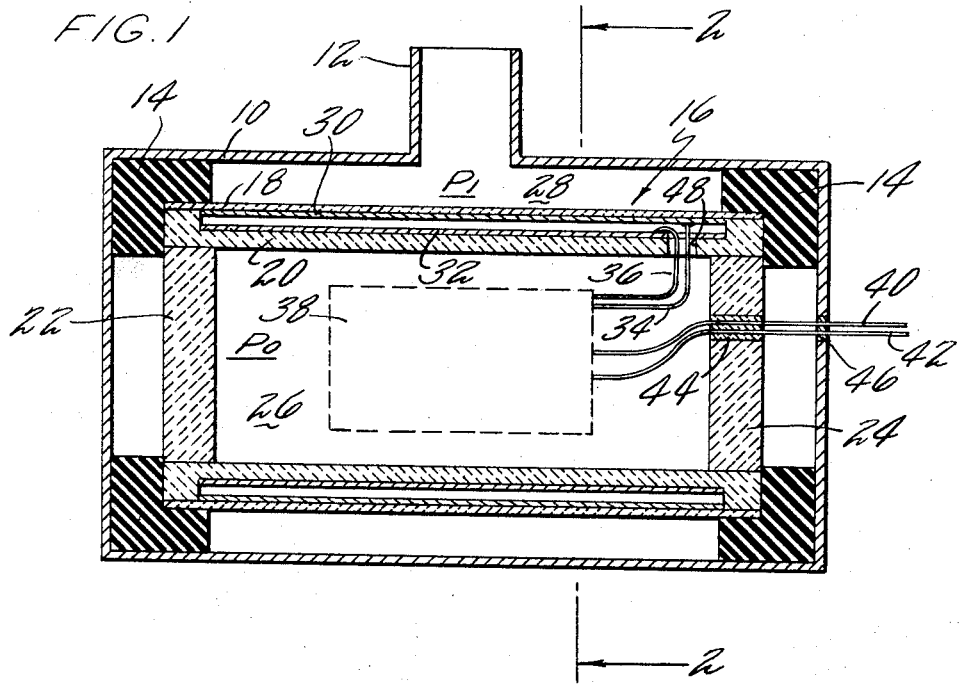
FIG. 1 is a cross-sectional view of my pressure transducer.
Figure 2:
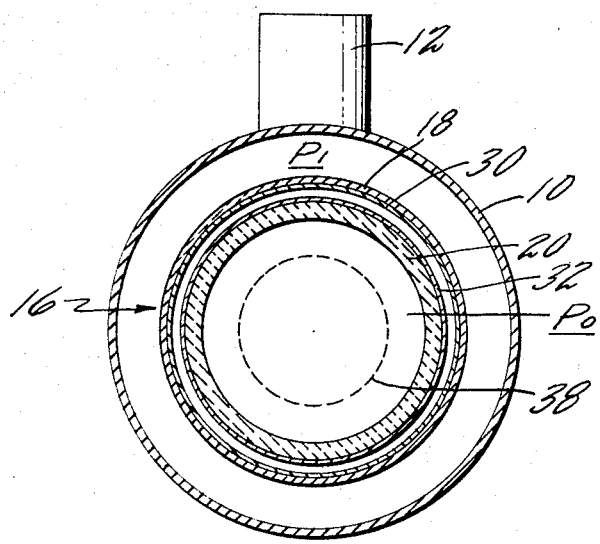
FIG. 2 is a sectional view taken along the line 2—2 of FIG. 1.

Referring to FIG. 1, my transducer is enclosed in a cylindrical housing 10 having fitting 12 for receiving a pressure to be measured. The walls of my housing 10 define the chamber 28 in which the pressure to be measured would be confined. Mounted within this housing on resilient bushings 14 is a cylindrical pressure capsule generally designated 16. The resilient bushings 14 hold the pressure capsule 16 concentrically within the cylindrical housing 10 and can be metallic springs or molded from styrofoam or other suitable material to support the capsule 16 within the housing 10 and protect it against shock loads or vibrations.

My pressure capsule 16 is comprised of two concentric cylinders 18 and 20 and end plates 22 and 24 which are made of a brittle material such as fused quartz. The pressure capsule 16 forms a sealed reference chamber 26 and the pressure to be measured $P_1$ will be applied to the external surface of the capsule 16 mounted within the chamber 28. As shown in FIG. 1, the external cylinder 18 is a relatively thin cylinder which will deflect toward the internal cylinder 20 under the high external pressure $P_1$. The cylinder 18 therefore acts as a diaphragm between the chamber 28 and the reference chamber 26. Cylinder 20 is perforated at 48 to equalize the pressure on its walls and to prevent the walls from deflecting. Also, by including the volume within cylinder 20 with the annular volume between the cylinders 18 and 20, a larger reference chamber is formed which maintains a more stable reference pressure $P_0$ when the diaphragm 18 deflects. An electricaly conductive coating 30 forms one capacitor plate of a variable capacitor on the inner surface of cylinder 18. Similarly a second electrically conductive coating 32 on the outer surface of cylinder 20 forms the confronting second capacitor plate of the variable capacitor. The electrical coatings can be of any suitable electrically conductive material such as platinum and can be applied to the surfaces of the cylinders by electroplating, evaporation deposition, sputtering, or formed in the surface as a cermet.

When a pressure $P_1$ is applied to the transducer, the external cylinder 18 being relatively thin will deflect inwardly. Cylinder 18 will carry with it the electrically conductive coating 30 and move the coating 30 toward the electrically conductive coating 32. As the coating 30 or first capacitor plate moves closer to the second stationary plate in response to the pressure differential $P_1-P_0$ across the diaphragm or external cylinder 18, the capacitance between the two plates will increase according to the general formula $$C = k\frac{A}{d}$$

where C is capacitance, $k$ is a constant of proportionality, A is the area of the plates and $d$ is the distance between the plates. In order to detect the change in capacitance, electrical conductors 34 and 36 are connected to the capacitor plates. These conductors 34 and 36 in turn connect the capacitor into a frequency sensitive cricuit generally designated by the numeral 38. As the capacitance of the transducer changes the tuning of the circuit, a detector will furnish a demodulated output. The output of this circuit can then be connected by means of conductors 40 and 42 to a suitable meter which may be directly calibrated in pressure. It is desirable, in order to keep the input impedance of circuit 38 high, to reduce the capacitance of the conductors by placing this circuit as close as possible to the capacitor plates. For this reason, the preferred embodiment shows the circuit 38 located within the reference chamber 26. In order to maintain the chambers 26 and 28 sealed, hermetic glass bead or lead seals 44 and 46 are used where the conductors 40 and 42 pass through the walls of the pressure capsule 16 and housing 10. Alternately, the circuit 38 could be placed outside of the pressure capsule 16 and the conductors 34 and 36 would lead directly from the conductive coatings to the circuit 38 through seals 44 and 46.

In another alternate construction, the outer cylinder 18 could be perforated and only the inner cylinder 20 would need to be sealed, the walls of cylinder 20 becoming the diaphragm. With such a construction, the reference chamber volume is decreased, but the number of sealed joints is reduced. Also, the output of such a transducer would be reversed in phase from that of the preferred embodiment because the plates of the capacitor would separate rather than close with increasing pressure differential.

It is an important teaching of my invention that coaxial cylinders 18 and 20 be formed from a brittle material. A brittle material is defined as a material which displays an entirely linear stress-strain relationship between the unstressed condition and fracture. The materials have no plastic region of deformation and they possess very low mechanical hysteresis and creep factors. Examples of these materials would include fused quartz, aluminum oxide, beryllium oxide, and a glass such as Pyrex.

Hysteresis can be defined as the energy expended in a cyclic flexing of the material between positive and negative limits. This characteristic factor displays itself as a small disparity in the strain measurements during such cyclic flexing. This factor can be measured in the same terms as the damping characteristic of the material, viscosity. Viscosity is derived from the damping rate of a torsional pendulum formed from the material and vibrating in a vacuum. Fused quartz, as one example of a brittle material, has been shown to have a viscosity of $.001 \times 10^{-9}$ poises compared with a low viscosity metal, such as nickel, having a viscosity of $1.65 \times 10^{-9}$ poises.

In transducers where the diaphragm deflects and the output depends upon the amount of deflection, the mechanical hysteresis factor must be as small as possible in order to maintain a high repeatability in the instrument readings. Naturally, the residual deflection in a pressure transducer diaphragm with a capacitive pick-off will yield a residual error in the pressure readings. The formula $$C = k \frac{A}{d}$$

shows the significance of the distance $d$ between the plates. In an instrument where accuracy is most important, the residual hysteresis error will destroy the linearity of the instrument. One important reason, therefore, for using a brittle material as a diaphragm in a capacitive-type pressure transducer is to take advantage of the hysteresis-resistant properties and thereby eliminate the residual error which would exist in such a transducer due to the hysteresis factor of the diaphragm material.

The second property of these brittle materials which makes their use desirable in an accurate pressure transducer is the low amount of creep deformation displayed by the materials. A diaphragm of a transducer, for example, can be exposed to a steady pressure for a long period of time. Since the deflection of the diaphragm in a capacitive-type transducer and the value of the pressure to which the diaphragm is exposed are supposed to remain proportional, the deflection and restraining force of the diaphragm should remain proportional. Creep deformation, however, causes a permanent stretch of the diaphragm which results in an increased deflection without an increase in the restraining force. This results in a change in the instrument readings without having any change in the pressure that the instrument is exposed to. Although hysteresis and creep are similar in effect, hysteresis occurs in a dynamic situation, while creep is associated with a comparatively static condition. It is, therefore, desirable to use a brittle material as a transducer diaphragm to take advantage of both the hysteresis-resistant and creep-resistant properties.

Despite the desirable characteristics of brittle materials, the brittle nature of such materials conflicts with the needs of a flexible diaphragm in a capacitive-type pressure transducer. These materials cannot withstand stress concentrations above the yield point stress without fracturing. They are, moreover, much weaker in tension than in compression. It is, therefore, an important teaching of my invention that the material be shaped such that it will experience primarily uniform compressive stress which the material can sustain. It is for this reason that my pressure capsule 16 is composed of concentric cylinders. When the pressure $P_1$ is applied to the capsule 16, the diaphragm 18 deforms inwardly and the resultant stress is almost perfectly uniform and compressive. This is the ideal way of stressing a brittle material. Non-uniform stressing will occur at the ends of the diaphragm but this can be calculated and shown to give permissible tensile stress levels.

The shape of the diaphragm, therefore, plays an important part in the use of a brittle material. The pressure capsule 16 employs the cylindrical shape in this preferred embodiment because of the ease of manufacture of the cylindrical form. It will be understood, however, that a spherical capsule would also be suitable because an external pressure applied to the convex surface of the sphere would cause a uniform compressive stress within the material. Of course, it will be recognized that curved surfaces other than the regular cylindrical or spherical shapes could be used as long as the pressure to be measured is applied to the convex surface of the material while the concave surface is exposed to a lower pressure. The material is then placed substantially in compression.

In the disclosed embodiment the reference chamber 26 would preferably be evacuated to insure a positive pressure differential from inside to outside of the diaphragm 18. In this case, the pressure differential would be $P_1-P_0$ and, since $P_0$ would be essentially zero, the measurement made by the instrument would be the absolute pressure reading $P_1$. In such embodiment the diaphragm 18 would always experience a higher pressure externally than internally and the material in the diaphragm 18 would always be in compression.

Several properties of fused quartz make it particularly suited to a capacitive-type transducer use. This material has a coefficient of thermal expansion which is less than $\frac{1}{20}$ that of steel. Also, the change of the coefficient of elasticity with temperature is about $\frac{1}{2}$ of that for steel. Because of the desirable temperature characteristics of fused quartz, it is used in the preferred embodiment. If the other materials are used in an installation in which temperature changes are significant, then conventional compensating networks can be added.

It will also be understood that variations in the disclosed embodiment can be made without deviating from the spirit of the invention. For example, a second pressure fitting could be installed between the reference chamber and a second pressure source. In this installation, the pressure reading emitted from the instrument would be the differential of the second pressure source and the test pressure $P_1$. In this particular design it would be preferable that the lower of the two pressures be connected to the chamber 26 in order to avoid excessive tensile stress in the diaphragm 18. With the lower pressure applied to chamber 26, the pressure differential would deflect the diaphragm 18 inwardly with the attendant compressive stress described above. In this form the transducer becomes a differential pressure transducer.

In the construction shown in which the cylinders 18 and 20 and end plates 22 and 24 are fused quartz, it would be desirable to join the members by means of an electron beam welding process. In this embodiment all the structural members would become an integral body of fused quartz. This is desirable for three reasons. First, there are no dissimilar materials with different temperature expansion coefficients and therefore any change in temperature would not cause thermal stresses within the material. Second, because fused quartz has a very low thermal coefficient of expansion, the dimensions of the pressure capsule would remain fairly constant. This is particularly critical in the capacitive-type transducer shown because the change in capacitance is inversely proportional to the separation between the plates 30 and 32 as shown above. Third, the material forming the joint between the parts will be the same low hysteresis material as the rest of the pressure capsule.

Other methods of joining the cylinders 18 and 20 and end plates 22 and 24 might employ either a thin layer of lead solder or a refractory cement between the mating surfaces. These methods are less complicated and offer an economic advantage over the electron beam method.

Thin metallic hemispheres made of a material such as copper could be soldered to the ends of the quartz cylinder 20 in place of the quartz end plates 22 and 24 shown in the preferred embodiment. The inside surface of the hemispheres should face outwardly to most favorably withstand the pressure $P_1$ applied to the external surface of the capsule 16. By using thin metallic hemispheres, the ends of the cylinders are sealed, but the thermal expansion of the thin hemispheres will not develop significant stresses in the cylinder 20.

It should be recognized that my transducer is insensitive to first order accelerations and vibrations. This is true because an acceleration in the vertical plane of FIG. 1 might, for example, cause the upper half of cylinder 18 to move closer to cylinder 20 and consequently decrease the space between the capacitor plates 30 and 32. However, a compensating effect would occur on the lower half of the cylinders 18 and 20 which would tend to move the capacitor plates 30 and 32 apart. The net result of this acceleration or vibration would be a zero change in capacitance and therefore a zero change in the pressure indication. An acceleration in the horizontal plane would have no effect on the capacitor plates 30 and 32. The instrument, therefore, is not only protected from accelerations by the resilient bushings 14 but has a second compensating effect inherently embodied in the design to minimize errors due to accelerations and vibrations.

It is to be understood that the invention is not limited to the specific embodiment herein illustrated and described but may be used in other ways without departure from its spirit as defined by the following claims.

I claim:

1. A hysteresis-resistant and creep-resistant capacitive pressure transducer comprising:
   (a) a housing having a high pressure chamber and a low pressure chamber;
   (b) a diaphragm of a brittle material mounted within the housing and separating the high pressure chamber from the low pressure chamber, the diaphragm being deformable in response to variations in the pressures of the chambers and having a convex surface confronting the high pressure chamber to place the diaphragm in the deformed state substantially in compression;
   (c) an electrically conductive layer on one surface of the diaphragm to form a first capacitor plate; and
   (d) a second capacitor plate mounted within the housing and spaced from and confronting the curved diaphragm, said first capacitor plate and said second capacitor plate forming a variable capacitor responsive to variations in the pressures of the chambers.

2. A pressure transducer comprising:
   (a) a housing defining a first chamber for receiving a fluid under a first pressure;
   (b) first and second spaced concentric cylinders mounted within the chamber, the first cylinder being sealed at its ends to define a second chamber therewithin for containing a fluid under a second pressure lower than the first pressure, the wall of the first cylinder being formed from a brittle material having a viscosity no greater than $.001 \times 10^{-9}$ poises and deformable in response to the pressure differential of the first pressure and the second pressure;
   (c) an electrically conductive layer on the deformable wall to form a first plate of a variable capacitor; and
   (d) means providing the wall of the second cylinder with an electrically conductive surface to form a second plate of the variable capacitor for electrically measuring the difference of said pressures.

3. A capacitive pressure transducer comprising:
   (a) a housing forming a first chamber for a fluid under a first pressure;
   (b) a thin-walled first cylinder of fused quartz;
   (c) means resiliently mounting the first cylinder within the chamber;
   (d) a second cylinder of fused quartz concentrically mounted within and radially spaced from the first cylinder;
   (e) sealing means closing the ends of the first cylinder to form a second chamber for a fluid under a second pressure, the second pressure being less than the first pressure;
   (f) a first electrically conductive coating on one surface of the first cylinder to form a first capacitor plate;
   (g) a second electrically conductive coating on one surface of the second cylinder to form a second capacitor plate; and
   (h) means connecting the capacitor plates to a circuit for measuring the change in capacitance between the first and second plates as the first capacitor plate on the thin-walled cylinder deflects in response to the variations of the first and second pressures.

4. Apparatus according to claim 3 wherein:
   (a) the second cylinder is perforated; and
   (b) the sealing means includes and closes the ends of the second cylinder.

5. Apparatus according to claim 3 wherein the first and the second electrical coatings are on confronting surfaces of the cylinders.

6. A capacitive pressure sensor having hysteresis-resistant and creep-resistant properties comprising:
   (a) a capsule formed from a brittle material and having a pressure-deformable wall, the wall having a concave inner surface and a convex outer surface, the convex outer surface being exposed to a fluid under pressure;
   (b) an electrically conductive coating on one of the surfaces of the pressure-deformable wall to form a pressure-deformable first plate of a variable capacitor; and
   (c) a second plate of the variable capacitor spaced from said pressure-deformable first plate for electrically measuring the pressure of the fluid through the deformation of said first plate with respect to said second plate.

References Cited

UNITED STATES PATENTS

| | | | |
|---|---|---|---|
| 1,939,067 | 12/1933 | Legg | 73—398 |
| 2,848,710 | 8/1958 | Owen | 340—200 |
| 3,111,848 | 11/1963 | Cornelison | 73—418 |
| 3,195,028 | 7/1965 | Werner et al. | 73—398 XR |

S. CLEMENT SWISHER, *Acting Primary Examiner.*

DONALD O. WOODIEL, *Assistant Examiner.*

Disclaimer 3,405,559.—*Elbert Marston Moffatt*, Glastonbury, Conn. PRESSURE TRANSDUCER. Patent dated Oct. 15, 1968. Disclaimer filed Jan. 17, 1972, by the assignee, *United Aircraft Corporation*.

Hereby enters this disclaimer to claim 6 of said patent.

[*Official Gazette July 25, 1972.*]